United States Patent Office 3,209,949
Patented Oct. 5, 1965

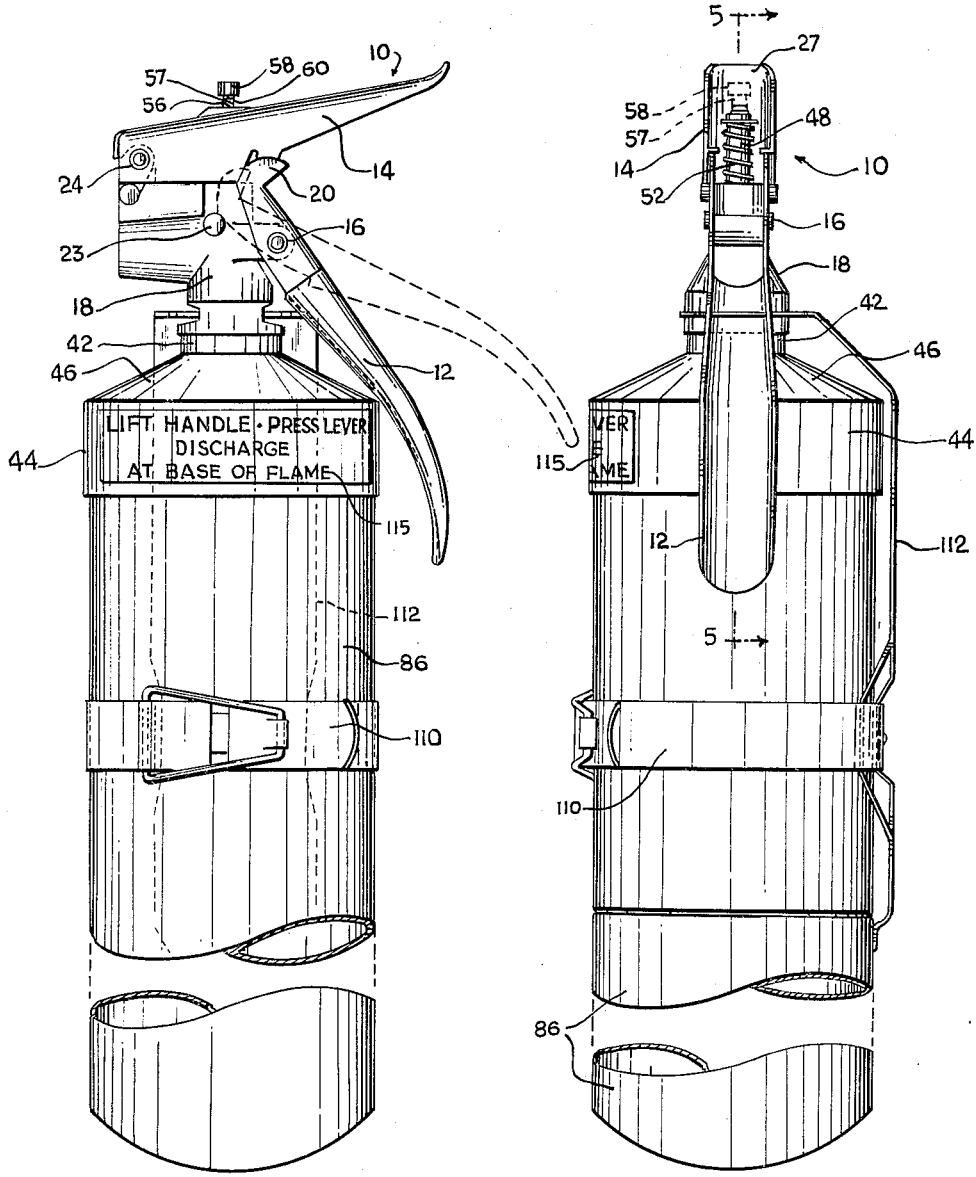

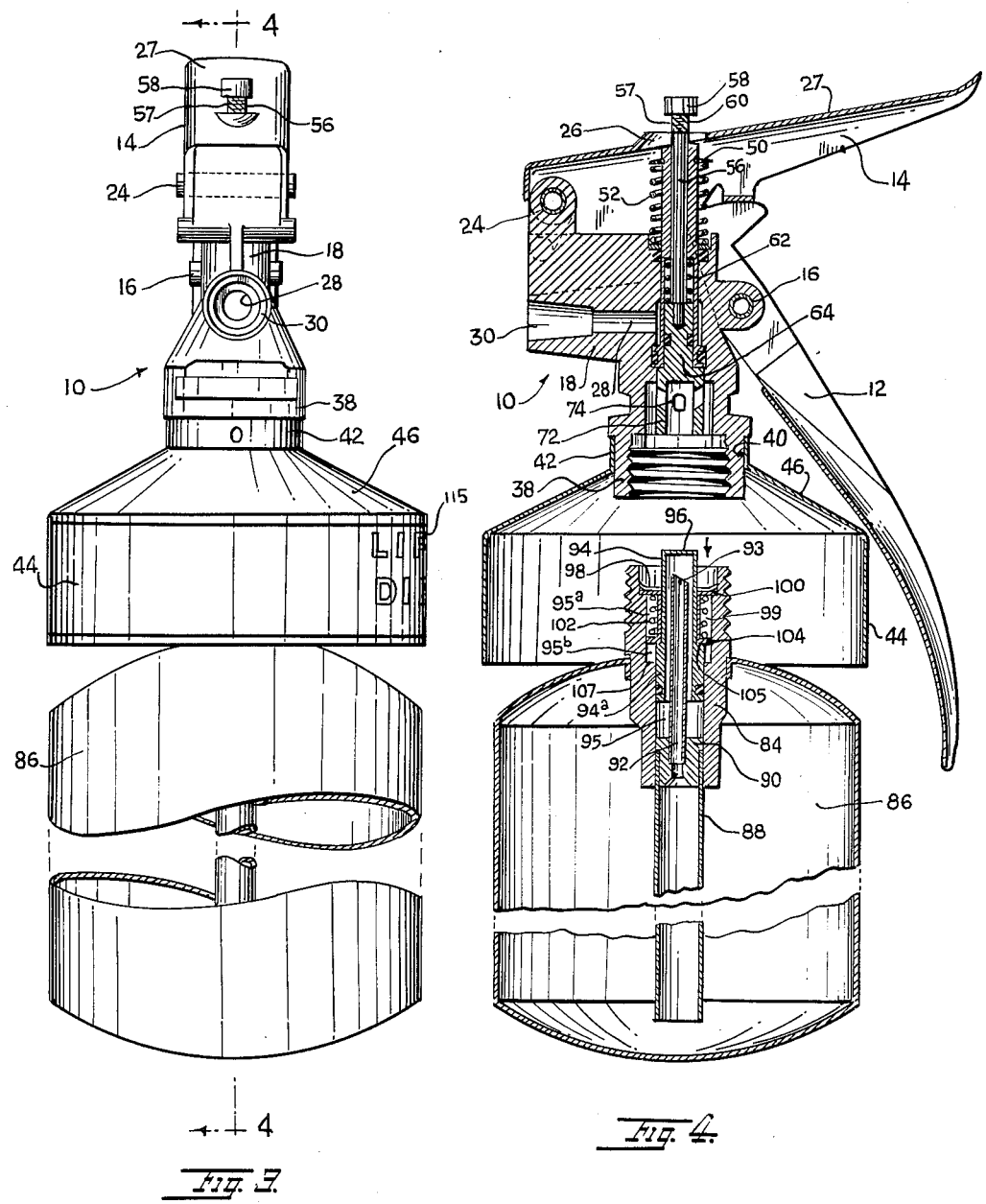

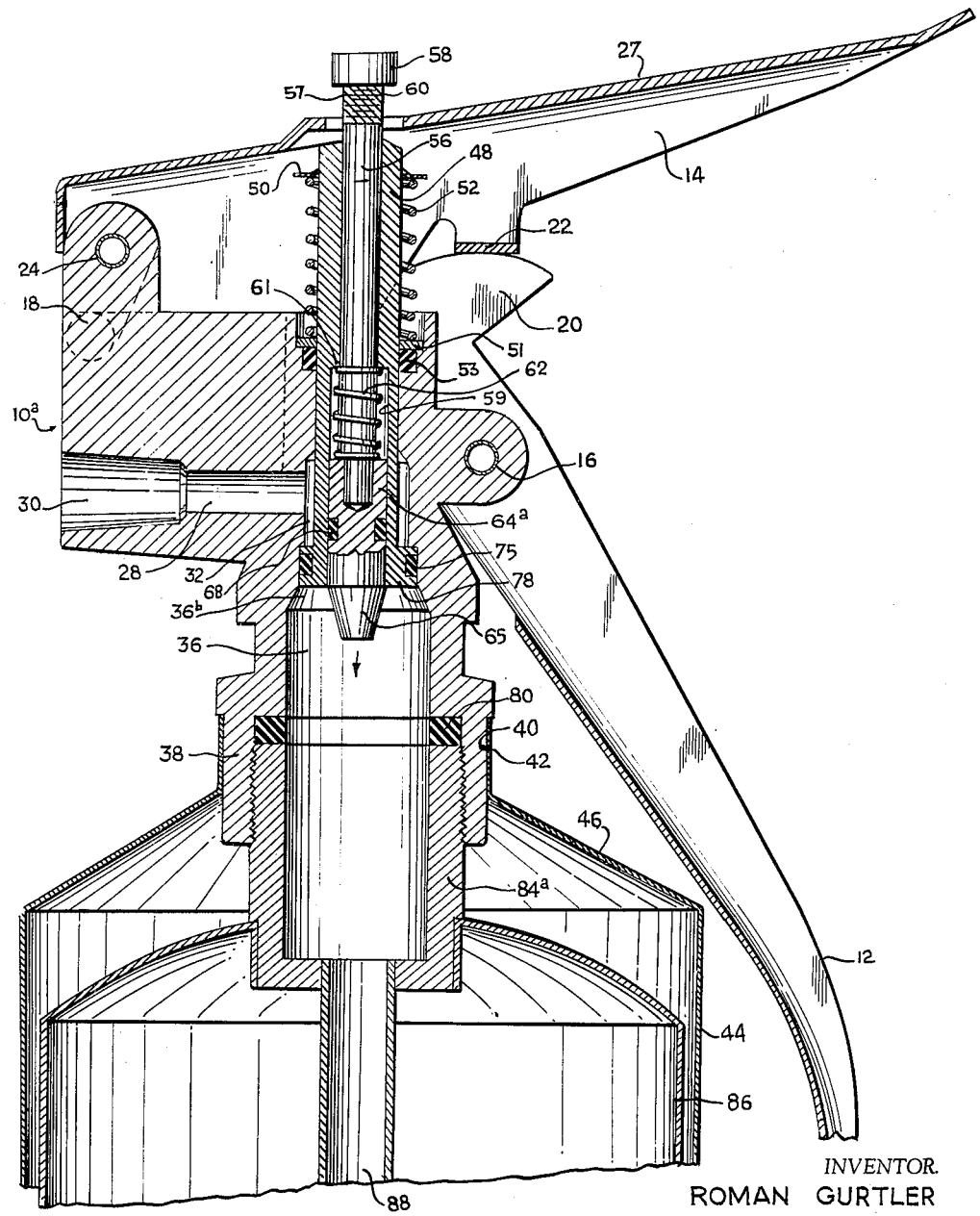

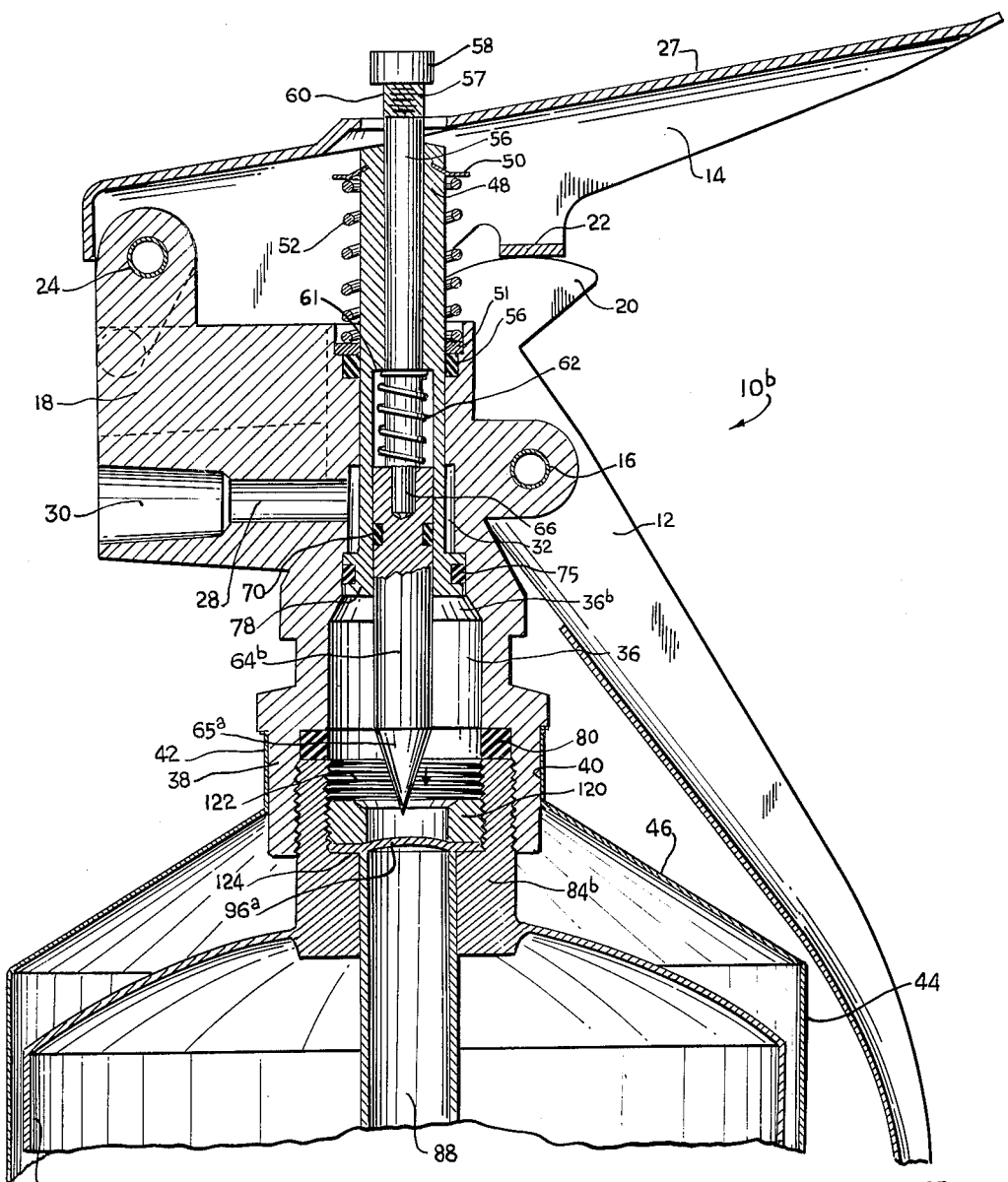

3,209,949
OPERATING VALVE WITH PRESSURE
INDICATING DEVICE
Roman Gurtler, Chester, N.Y., assignor, by mesne assignments, to The Casco Products Corporation, Bridgeport, Conn., a corporation of Connecticut
Filed Mar. 8, 1963, Ser. No. 263,809
16 Claims. (Cl. 222—49)

This invention relates to a dispensing device for a pressurized container and more particularly concerns a valve assembly with an associated pressure indicating and testing device for a pressurized container.

The invention may be used with a container having a siphon tube. The invention may be further provided with means for piercing a frangible diaphragm normally closing the container or a siphon tube in the container.

It is a principal object of the invention to provide a dispensing device for controlling discharge of fluid, gas or pulverized solid material under pressure from a container, with pressure indicating and testing means in the assembly.

A further object is to provide a pressure indicating dispensing device as described adapted for use in conjunction with a container having a stationary, rupturable diaphragm closure.

Another object is to provide a pressure indicating dispensing device as described adapted for use with a pressurized container having a floating nozzle closed by a diaphragm seal, the valve assembly including means for piercing the diaphragm to release fluid under pressure to the valve assembly.

Another object is to provide a dispensing device as described which is capable of indicating the pressure in the container both before and after the sealing element is ruptured, this being accomplished by an element operable in the fluid passageway of the dispensing valve housing.

According to the invention the valve assembly provides precise control of rate of flow and direction of discharge, and permits continuous or intermittent discharge at will. The valve assembly includes a spring loaded stem which is partially exposed to indicate visually that the container on which the assembly is mounted is under pressure. The stem can be manually pressed inwardly of the valve assembly to confirm by touch the visual indication of pressure. The stem can be color coded or provided with a pressure scale to indicate pressure in the container. The valve mechanism may be used with a sealing device of the type disclosed herein, but its use is not limited thereto and may be used with various types of pressurized containers and vessels. The invention may be used with pressurized vessels having interiors open directly to the valve assembly. The invention may be further used with pressurized vessels sealed by diaphragms adapted to be pierced by mechanical or other means associated with the valve assembly. The invention is particularly intended for use in portable fire extinguishers but its use is not limited thereto and may be applied to other types of pressurized vessels.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a valve assembly embodying the invention shown mounted on a pressurized container forming part of a fire extinguisher, parts of the container being broken away.

FIG. 2 is a rear elevational view taken 90° from the view of FIG. 1.

FIG. 3 is a front elevational view of the valve assembly shown separated from the container, parts of the container being broken away.

FIG. 4 is a sectional view taken on line 4—4 of FIG. 3.

FIG. 6 and FIG. 7 are sectional views similar to FIG. 5 showing modifications of the invention.

Figure 5:
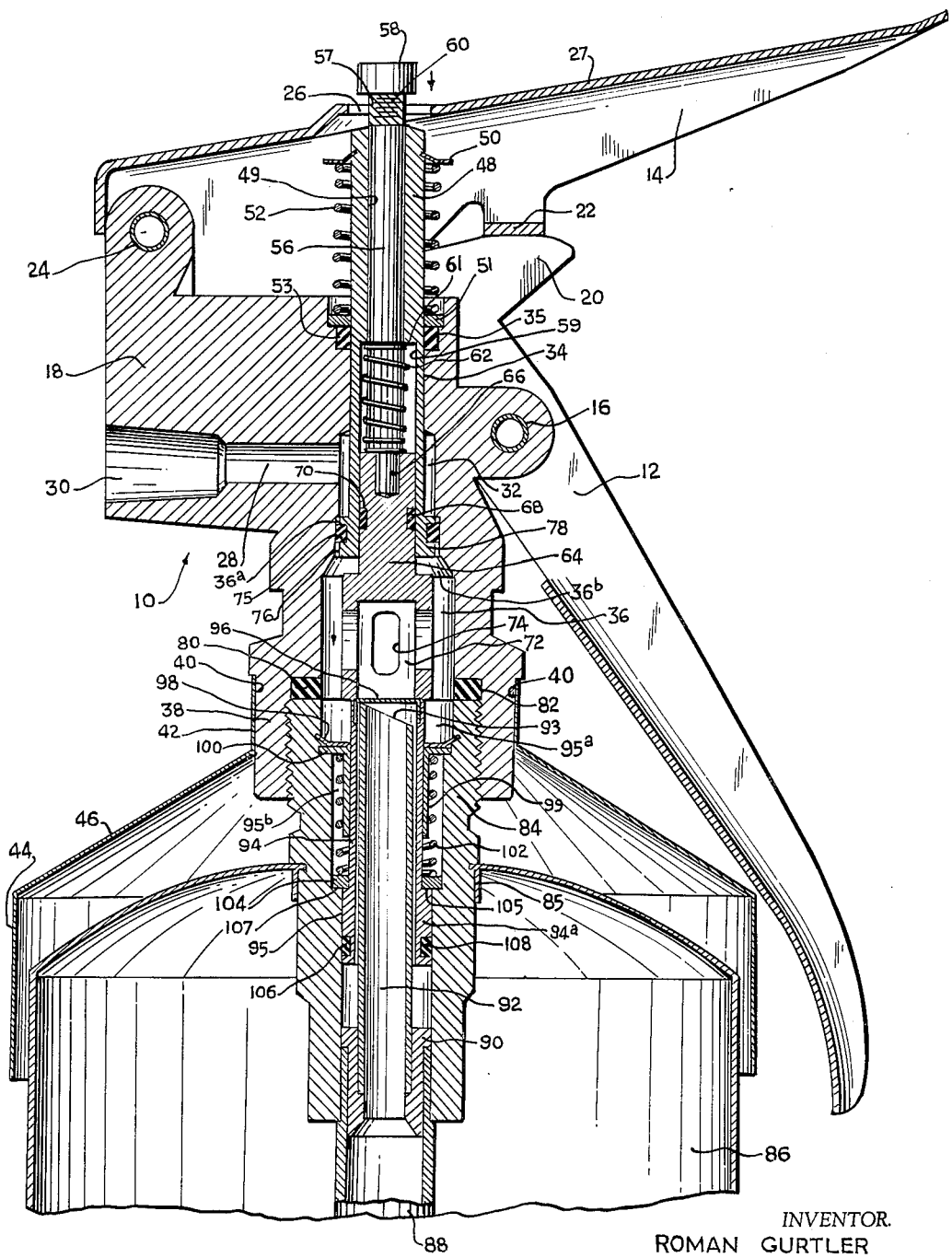
FIG. 5 is a fragmentary sectional view on an enlarged scale taken on line 5—5 of FIG. 2.

Referring to FIGS. 1-5, there is shown a valve assembly 10. The valve assembly includes a safety handle 12 and an operating lever 14. Handle 12 has an open frame structure pivoted on a sleeve pin 16 mounted on valve body 18. The handle has heads 20 at its inner end which are engaged by crossbar 22 of lever 14 and which prevent operation of the lever unless the handle is lifted to an upper position shown in dotted lines in FIG. 1. Stop pins 23 limit lifting movement of the handle.

Lever 14 is pivotally mounted on a sleeve pin 24 carried by valve body 18. The lever has a channel shape with a hole 26 provided between opposite ends of its straight back or spine 27. The valve body has a front discharge outlet defined by a transverse bore 28 communicating with an enlarged flaring orifice 30. Bore 28 opens into a longitudinal cylindrical bore 32. Bore 32 communicates with an upper longitudinal bore 34 narrower than bore 32 and with a lower bore 36 which is wider than bore 34. At the bottom of the valve body 18 is an internally threaded skirt or flange 38. The flange has an external recess 40 which receives the neck 42 of a protective hood 44 having a tapered, conical shoulder 46. The upper end of bore 34 opens into an enlarged recess 35 at the top of body 18.

A cylindrical sleeve 48 is axially slidable in bore 34. The upper end of sleeve 48 extends above the top of the valve body 18 and carries a retainer spring ring 50. A coil spring 52 is axially mounted on sleeve 48 and bears on the underside of ring 50 at the top. The bottom end of the spring seats on a washer 51 in recess 35. A sealing O-ring 53 is disposed in the bottom of the recess around the sleeve.

A cylindrical stem 56 is axially slidable in an axial bore 49 in sleeve 48. The stem extends upwardly through hole 26 and terminates in a disk or button 58. The upper end 57 of the stem may have a scale 60 marked thereon and in addition this upper end may be colored red, yellow, green or some other distinctive color.

The bore 49 has a lower enlarged section 59. A coil spring 62 is mounted on the lower end of the stem and bears on the underside of shoulder 61 at the top of bore section 59. The bottom end of the spring 62 bears on cylindrical stem body 64 secured on peg 66 formed at the lower end of the stem. A sealing O-ring 68 is engaged in an annular recess 70 in stem body 64 to seal the bore section 59.

The bottom of stem body 64 has a cup-shaped flange 72 provided with circumferentially spaced elongated openings 74. A sealing O-ring 75 is engaged in a recess 76 of an annular flange 78 at the bottom of sleeve 48 to seal the upper narrower portion 36ᵃ of bore 36.

A washer 80 seats in recess 82 at the upper inner end of flange 38. Flange 38 can be screwed tightly on the upper externally threaded end of a generally cylindrical nozzle body 84. The nozzle body fits tightly in opening 85 at the upper end of a cylindrical container 86 of any fluid or liquid under pressure to be discharged therefrom under control of the valve assembly 10. A siphon tube 88 may be secured in the lower end of nozzle body 84 to extend axially downward in container 86. The upper end of the siphon tube is fixed in a sleeve block 90. A tube 92 extends upwardly of block 90 and terminates in a slanted, rather sharp pointed tip 93. A nozzle tube 94 has its lower end section 94ᵃ slidably mounted in bore 95 of the nozzle body 84. Tube 94 is concentric with and surrounds fixed tube 92. At the upper end of tube 94 is fixed a thin diaphragm 96 which closes the end of tube 94.

A retainer spring ring 98 is engaged in upper wider section 95$^a$ of bore 95. A short tube 99 is secured to tube 94 and moves therewith axially of tube 92 in central bore section 95$^b$. Tube 99 has an annular flange 100 under which bears a coil spring 102 surrounding tubes 92, 99. The lower end of spring 102 bears on a washer 104 seated on shoulder 105 at the top of lower tube section 94$^a$. A sealing O-ring 106 is seated in a recess 108 at the bottom end of tube 94 to seal bore 95. A seat 107 serves as a stop for washer 104 at the bottom of bore section 95$^b$.

In FIGS. 1–4 end 57 of stem 56 is shown fully extended above the top 27 of operating lever 14. The diaphragm 96 is shown intact and unbroken in FIG. 4. In FIGS. 1 and 2 the valve assembly is mounted on the nozzle body 84. The stem end 57 will remain fully extended as long as sufficient pressure is maintained in container 86. The pressure in container 86 will force floating nozzle tube 94 upwardly which will hold stem 56 and stem body 64 elevated against tension in spring 52. The scale 60 will indicate the magnitude of pressure in the container.

If it is desired to unseal the container, the diaphragm 96 may be broken by pushing down on button 58 or by depressing the lever 14. As indicated in FIG. 5, the stem 56 is partially retracted. The stem body 64 contacts the rim of the diaphragm 96 and upper end of floating tube 94. Any further inward pressure on the stem will cause the pointed end of the tube 93 to pierce the diaphragm. The pressure in the container will then be released into bore 36 and will be applied to the flange 78 at the bottom end of sleeve 48. The pressure will also be applied to the stem body 64 and cup flange 72 to force the stem 56 upwardly. The pressure can be manually tested by pressing down on button 58. If the stem yields and then extends outwardly fully when released, pressure in the container is maintained. If the stem retracts until button 58 contacts the top of sleeve 48, the pressure in the container is low, and below the magnitude measurable by scale 60. The scale is calibrated against the tension in spring 62.

After the diaphragm 96 is ruptured, the valve assembly can be used to control the release of fluid under pressure from the container. By raising safety handle 12, the lever 14 can be depressed against tension in spring 52. As the lever 14 is lowered, sleeve 48 descends until flange 78 moves into the enlarged bore 36. Fluid under pressure will pass through the holes 74 in flange 72 to bore 36 and then past flange 78 to bore 32 and out of the outlets 28 and 30. The conical nozzle bore 30 can be directed axially in any desired direction by manipulation of the container 86. Release of lever 14 will stop the flow of fluid. Partial release of the lever will effect a constriction of the tapered portion 36$^b$ of bore 36 to limit the flow of fluid.

When the lever 14 is released, the handle 12 can be raised to lock the lever 14 in elevated position. To facilitate manipulation of the container and to support it on a suitable mounting when not in use, a strap 110 can be provided around the container and a hanger bracket 112 can be provided on the container 86 as indicated in FIGS. 1 and 2. Operation instructions 115 can be provided on the hood 44.

FIG. 6 shows a valve assembly 10$^a$ which is similar to valve assembly 10 and similar parts are identically numbered. In assembly 10$^a$, the stem body 64$^a$ on peg 66 has a blunt conical end 65. Pressure in the container 86 is applied to the body end 65 via siphon tube 88. Nozzle body 84$^a$ is engaged with flange 38 of the valve body 18. The floating tube 94, diaphragm 96, piercing tube 92 and spring 102 of valve assembly 10 are all omitted. The stem 56 indicates the existence of pressure in the container by the extension of color coded end 57 and the appearance of scale 60. The pressure in the container can be tested by manually pressing button 58. Release of fluid from the container 86 is effected under control of the lever 14 as in valve assembly 10.

FIG. 7 shows valve assembly 10$^b$ similar to valve assemblies 10 and 10$^a$ and similar parts are identically numbered. The stem body 64$^b$ has a pointed conical tip 65$^a$ normally disposed over diaphragm 96$^a$ sealing nozzle 84$^b$ at the top of container 86. The diaphragm is secured by a threaded ring or nut 120 in a threaded bore 122 of nozzle 84$^b$. The diaphragm is held on an annular seat 124 in the bore 122. By pushing the button 58, the conical tip 65$^a$ will pierce the diaphragm 96$^a$. The pressure in the container will then be applied to the stem body to force the stem upwardly against tension in spring 62. If the stationary sealing diaphragm 96$^a$ is broken and pressure has fallen in the container 86, a light finger pressure on button 58 will depress the stem. If the pressure is sufficiently low the colored end 57 of the stem will be fully retracted into the lever 14 and sleeve 48. The appearance of stem end 57 indicates the container is under pressure and the reading of scale 60 indicates the magnitude of pressure. The valve assembly controls the release of fluid in the same manner as in valve assemblies 10 and 10$^a$.

FIGS. 6 and 7 illustrate use of the valve assembly without a floating pressure seal as employed in valve assembly 10. The valve assemblies are of general application and can be used with pressurized vessels and containers of many types, both portable and stationary.

The parts of the valve assembly can be made of inexpensive metal or plastic parts. The structure will be durable, long lasting, positive in action and provide indications at all times of pressure conditions in the vessel with which the valve structure is associated.

Although the diaphragms 96 and 96$^a$ can be ruptured by manual pressure on button 58 to retract stem 56, it is possible to provide the valve assembly with an electrically operated solenoid to retract the stem. Alternatively, an explosive device can be associated with the valve assembly to retract the stem upon explosion of a squib in the device. Various other electrical or mechanical arrangements can be provided for retracting the stem to pierce the sealing diaphragm of the container without requiring application of manual force to accomplish release of fluid pressure to the valve assembly.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A dispensing device for a container of fluid under pressure, comprising a valve body mountable on said container to receive said fluid therefrom, said body having a discharge orifice, a bore extending through said valve body and communicating with said orifice, a valve sleeve movably mounted in said valve body bore and cooperable therewith to open and close said bore, means for actuating said sleeve to pass fluid through said bore and orifice when said sleeve is moved thereby to clear said bore, a stem axially movable in said valve sleeve, and a stem body at one end of the stem extending beyond said valve sleeve within said valve body and adapted to be in communication with the pressure in said container, said stem having another end extending beyond said sleeve outside of the valve body, whereby pressure applied in said valve body to said stem body moves said stem body outwardly of said valve sleeve and extends said other end of the stem beyond said sleeve to indicate the magnitude of pressure in the valve body.

2. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, and a stem body at one end of the stem extending beyond said sleeve in said valve body, said stem having another end extending beyond said sleeve outside of the valve body, whereby pressure applied in said valve body to said stem body extends said other end of the stem beyond said sleeve to indicate the magnitude of pressure in the valve body, diaphragm means carried by said container and sealing the same from said valve body, and means carried by the stem body for piercing said diaphragm means when said stem is retracted in said sleeve.

3. A dispensing device for a container of fluid under pressure, comprising a valve body mountable on said container to receive said fluid therefrom, said body having a discharge orifice, a bore extending through said valve body and communicating with said orifice, a valve sleeve movably mounted in said valve body bore and cooperable therewith to open and close said bore, means for actuating said sleeve to pass fluid through said bore and orifice when said sleeve is moved thereby to clear said bore, a stem axially movable in said valve sleeve, a stem body at one end of the stem extending beyond said valve sleeve within said valve body and adapted to be in communication with the pressure in said container, spring means in said valve sleeve biasing the stem to a normal retracted position in said valve sleeve, said stem having another end extending beyond said sleeve outside said valve body, whereby pressure applied in said valve body to said stem body moves said stem body outwardly of said valve sleeve and extends said other end of the stem beyond said sleeve to indicate the magnitude of pressure in the valve body.

4. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, a stem body at one end of the stem extending beyond said sleeve in said valve body, spring means in said sleeve biasing the stem to a normal retracted position in said sleeve, said stem having another end extending beyond said sleeve outside said valve body, whereby pressure applied in said valve body to said stem body extends said other end of the stem beyond said sleeve to indicate the magnitude of pressure in the valve body, diaphragm means carried by said container and sealing the same from said valve body, and means carried by the stem body for piercing said diaphragm means when said stem is retracted in said sleeve.

5. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, a stem body at one end of the stem extending beyond said sleeve in said valve body, said stem having another end extending beyond said sleeve outside of the valve body, whereby pressure applied in said valve body to said stem body extends said other end of the stem beyond said sleeve to indicate the magnitude of pressure in the valve body, a nozzle body on said container receiving and supporting said valve body, a tube slidably disposed in said nozzle body, a diaphragm at one end of the tube sealing said container, and a fixed member carried by said nozzle body and extending within said tube to rupture said diaphragm when said tube is sufficiently retracted into said nozzle body, said stem body being normally in contact with said diaphragm and said tube and elevated thereby by fluid pressure applied from said container, whereby sufficient retraction of said stem into said sleeve causes said member to rupture said diaphragm and expose said valve body and stem body to the fluid pressure.

6. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, a stem body at one end of the stem extending beyond said sleeve in said valve body, said stem having another end extending beyond said sleeve outside of the valve body, whereby pressure applied in said valve body to said stem body extends said other end of the stem beyond said sleeve to indicate the magnitude of pressure in the valve body, a nozzle body on said container receiving and supporting said valve body, a floating tube slidably disposed in said nozzle body, a diaphragm at one end of the tube sealing said container, stop means in the nozzle body, spring means normally extending said tube away from said stop means, and a fixed pointed member carried by said nozzle body and extending within said tube, said stem body being normally in contact with said diaphragm and tube and elevated thereby by fluid pressure applied from said container, whereby sufficient retraction of said stem into said sleeve causes said fixed member to rupture said diaphragm as the tube is retracted against said stop means so that said valve body and stem body are exposed directly to said fluid pressure through said nozzle body.

7. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, and a stem body at one end of the stem extending beyond said sleeve in said valve body, said stem having another end extending beyond said sleeve outside of the valve body, whereby pressure applied in said valve body to said stem body extends said other end of the stem beyond said sleeve to indicate the magnitude of pressure in the valve body, a diaphragm, a nozzle body at an opening in said container, means securing said diaphragm in a stationary position in said nozzle body to seal said opening, said stem body having a pointed end to pierce said diaphragm when said stem is retracted in said sleeve and said valve body is mounted on said nozzle body.

8. A dispensing device for a container of fluid under pressure, comprising a valve body mountable on said container to receive said fluid therefrom, said body having a discharge orifice, a bore extending through said valve body and communicating with said orifice, a valve sleeve movably mounted in said valve body bore and cooperable therewith to open and close said bore, means for actuating said sleeve to pass fluid through said bore and orifice when said sleeve is moved thereby to clear said bore, a stem axially movable in said valve sleeve, and a stem body at one end of the stem extending beyond said valve sleeve within said valve body and adapted to be in communication with the pressure in said container, said stem having another end extending beyond said sleeve outside of the valve body, whereby pressure applied in said valve body to said stem body moves said stem body outwardly of said valve sleeve and extends said other end of the stem beyond said sleeve to indicate the magnitude of pressure in the valve body, said stem having a manually operable button at the other end of the stem for manually retracting said stem to test pressure in said container.

9. A dispensing device for a container of fluid under pressure, comprising a valve body mountable on said container to receive said fluid therefrom, said body having a discharge orifice, a bore extending through said valve body and communicating with said orifice, a valve sleeve movably mounted in said valve body bore and cooperable therewith to open and close said bore, means for actuating said sleeve to pass fluid through said bore and orifice when said sleeve is moved thereby to clear said bore, a stem axially movable in said valve sleeve, and a stem body at one end of the stem extending beyond said valve sleeve within said valve body and adapted to be in communication with the pressure in said container, said stem having another end extending beyond said sleeve outside of the valve body, whereby pressure applied in said valve body to said stem body moves said stem body outwardly of said valve sleeve and extends said other end of the stem beyond said sleeve to indicate the magnitude of pressure in the valve body, said stem having a manually operable button at the other end of the stem for manually retracting said stem to test pressure in said container, said other end of the stem being colored and having a scale thereon for indicating magnitude of pressure in the container.

10. A dispensing device for a container of fluid under pressure, comprising a valve body mountable on said container to receive said fluid therefrom, said body having a discharge orifice, a bore extending through said valve body and communicating with said orifice, a valve sleeve movable in said bore to open and close said bore, a lever for actuating said sleeve to pass fluid through said bore and orifice when said sleeve is moved by the lever to clear said bore, a stem axially movable in said sleeve, a stem body at one end of the stem extending beyond said sleeve in said valve body, said stem having another end extending beyond said sleeve outside of the valve body, whereby pressure applied in said valve body to said stem body extends said other end of the stem beyond said sleeve to indicate the magnitude of pressure in the valve body, said stem having a manually operable button at the other end of the stem for manually retracting said stem to test pressure in said container, said other end of the stem being colored and having a scale thereon for indicating magnitude of pressure in the container, and a safety handle pivotally mounted on said valve body and engageable with said lever to hold the same in an elevated position out of engagement with said sleeve to prevent accidental discharge of fluid from said orifice.

11. In a dispensing and indicating device for a container having fluid pressure therein and having rupturable sealing means to seal the same, said device having a housing, a dispensing valve therein, and means providing a fluid passage from the container to the housing, the improvement comprising means in said fluid passage movable in response to fluid pressure in the container before the sealing means is ruptured; means in said fluid passage movable in response to movement of said first named means before the sealing means is ruptured and movable in response to the fluid pressure in the housing after the sealing means is ruptured; and pressure indicating means responsive to movement of said second named movable means for indicating respectively the fluid pressure in the container before rupture of said sealing means or in the housing after rupture of said sealing means.

12. A dispensing and indicating device for a container of fluid under pressure, comprising a housing mountable on the container and adapted to receive said fluid therefrom, manually operable flow control means mounted in said housing for selectively preventing and permitting flow of said liquid therethrough, first pressure responsive means movably mounted within said flow control means, second pressure responsive means movably mounted in said housing, said first and second pressure responsive means being in abutting engagement with each other, a pressure indicating means carried by said first pressure responsive means exteriorly of said housing, a rupturable element carried by said second pressure responsive means between said first and second pressure responsive means, said rupturable element normally sealing said container against discharge of said liquid, and means responsive to actuation of said flow control means for rupturing said rupturable element, whereby said second pressure responsive means moves in response to a predetermined minimum pressure in said container and thereby moves said first pressure responsive means and said pressure indicating means carried thereon to indicate the pressure in said container prior to an actuation of said flow control means and rupture of said element, and whereby said first pressure responsive means and said pressure indicating means carried thereon moves directly in response to the pressure in said container and in said housing to indicate the pressure in said container subsequent to an actuation of said flow control means and rupture of said element.

13. A device as set forth in claim 12 wherein said first pressure responsive means comprises a stem axially movable in said flow control means, a stem body at one end of said stem extending inwardly toward said container beyond said flow control means and contacting said second pressure responsive means, and yieldable resistance means interposed between said stem and said flow control means and normally urging said stem and said stem body in a direction opposed to that of said pressure to a normal retracted position in said flow control means, the opposite end of said stem carrying said pressure indicating means, whereby movement of said second pressure responsive means moves said stem body and said stem against said yieldably resistance means to cause said indicating means to indicate the pressure in said container prior to rupture of said element.

14. A device as set forth in claim 12 wherein said second pressure responsive means comprises a tube slidably mounted in said housing anad communicating with the pressure therewithin, one end of said tube contacting said first pressure responsive means, said tube carrying said rupturable element, and yieldable resistance means interposed between said tube and said housing and normally urging said tube in a direction opposed to that of said pressure to a normal retracted position in said housing whereby movement of said tube against said yieldable resistance means moves said first pressure responsive means and said indicating means carried thereon to indicate the pressure in said container prior to rupture of said element.

15. A valve assembly as set forth in claim 12 wherein said first and second pressure responsive means comprises a stem axially movable in said flow control means, a stem body at one end of said stem extending inwardly toward said container beyond said flow control means, the opposite end of said stem carrying said indicating means, a tube slidably mounted in said housing and communicating with the pressure therewithin, the outer end of said tube being in abutting engagement with the inner end of said stem body, said tube carrying said rupturable element, and first and second yieldable resistance means interposed between said stem and said flow control means and said tube and said housing respectively for normally urging said stem and said tube in a direction opposed to that of said pressure to normal retracted positions in said flow control means and said housing respectively, whereby movement of said tube against said second yieldable resistance means causes said movement of said stem body and stem against said first yieldable resistance means to cause said indicating means to indicate the pressure in said container prior to rupture of said element.

16. A valve assembly as set forth in claim 12 wherein said means for rupturing said element comprises a fixed pointed member mounted in said housing inwardly of said rupturable element and means interconnecting said flow control means and said first pressure responsive means for simultaneously moving said first and second pressure responsive means inwardly toward said container until said pointed member ruptures said element, whereby said first pressure responsive means is placed in direct communication with said pressure and moves in response thereto to cause said indicating means to indicate the pressure in said container subsequent to rupture of said element.

References Cited by the Examiner

UNITED STATES PATENTS

| | | | |
|---|---|---|---|
| 1,513,962 | 11/24 | Callahan et al. | 222—49 |
| 2,056,250 | 10/36 | Bystricky et al. | 222—49 |
| 2,513,377 | 7/50 | Stroop | 222—3 |
| 2,548,750 | 4/51 | Stroop | 222—23 X |
| 2,644,313 | 7/53 | Griggs | 222—3 X |
| 2,687,828 | 8/54 | Horrocks | 222—541 X |
| 2,796,135 | 6/57 | Nurkiewicz | 169—31 |
| 2,918,976 | 12/59 | Peterson | 169—31 |
| 3,051,652 | 8/62 | Olandt | 169—31 |
| 3,080,094 | 3/63 | Modderno | 222—82 |
| 3,105,458 | 10/63 | Downham | 169—31 X |
| 3,134,505 | 5/64 | Modderno | 222—394 X |

RAPHAEL M. LUPO, *Primary Examiner.*